United States Patent
Gonen et al.

(10) Patent No.: US 12,535,437 B2
(45) Date of Patent: Jan. 27, 2026

(54) METHODS FOR ANALYZING INTERMOLECULAR INTERACTIONS IN MICROCRYSTALS

(71) Applicant: The Regents of the University of California, Oakland, CA (US)

(72) Inventors: Tamir Gonen, Los Angeles, CA (US); Michael Martynowycz, Los Angeles, CA (US)

(73) Assignee: The Regents of the University of California, Oakland, CA (US)

(*) Notice: Subject to any disclaimer, the term of this patent is extended or adjusted under 35 U.S.C. 154(b) by 468 days.

(21) Appl. No.: 17/926,955

(22) PCT Filed: May 21, 2021

(86) PCT No.: PCT/US2021/033701
§ 371 (c)(1),
(2) Date: Nov. 21, 2022

(87) PCT Pub. No.: WO2021/237116
PCT Pub. Date: Nov. 25, 2021

(65) Prior Publication Data
US 2023/0228695 A1   Jul. 20, 2023

Related U.S. Application Data

(60) Provisional application No. 63/028,759, filed on May 22, 2020.

(51) Int. Cl.
*G01N 23/2055* (2018.01)
*G01N 23/20025* (2018.01)
(Continued)

(52) U.S. Cl.
CPC ... *G01N 23/2055* (2013.01); *G01N 23/20025* (2013.01); *H01J 37/305* (2013.01);
(Continued)

(58) Field of Classification Search
CPC .. H01J 37/00; H01J 37/02; H01J 37/28; H01J 37/26; H01J 37/305; H01J 2237/2201;
(Continued)

(56) References Cited

U.S. PATENT DOCUMENTS

2018/0108510 A1* 4/2018 Glaeser ................ H01J 37/26
2020/0158665 A1* 5/2020 Gonen .................. G01N 1/44
(Continued)

FOREIGN PATENT DOCUMENTS

WO  WO-2016/196386 A1  12/2016
WO  WO-2016/209907 A1  12/2016
(Continued)

OTHER PUBLICATIONS

De la Cruz et al., "Atomic resolution structures from fragmented protein crystals by the cryoEM method MicroED.," Nature Methods, 14: 399-402 w/ Supplementary Information (2017).
(Continued)

*Primary Examiner* — Jason L Mccormack
(74) *Attorney, Agent, or Firm* — Quarles & Brady LLP (57) ABSTRACT

Methods of introducing a small molecule into a crystal of a macromolecule, of obtaining a microcrystal having a macromolecule and a small molecule from a crystal of the macromolecule, of determining a structural model for a complex having a macromolecule and a small molecule, of identifying a small molecule that complexes with a macromolecule, and of screening a library of small molecules for their binding to a macromolecule are disclosed.

20 Claims, 4 Drawing Sheets
(4 of 4 Drawing Sheet(s) Filed in Color)

(51) Int. Cl.
*H01J 37/305* (2006.01)
*H01J 37/28* (2006.01)
(52) U.S. Cl.
CPC . *G01N 2223/3306* (2013.01); *G01N 2223/60* (2013.01); *H01J 37/28* (2013.01); *H01J 2237/2001* (2013.01); *H01J 2237/31749* (2013.01)
(58) Field of Classification Search
CPC ...... H01J 2237/31749; G01N 23/2055; G01N 23/20025; G01N 23/20058; G01N 2223/3306; G01N 2223/60; G01N 2223/0566; G01N 1/286; G01N 1/42; G01N 2001/2873
USPC .......................................... 250/306, 307, 311
See application file for complete search history.

(56) References Cited

U.S. PATENT DOCUMENTS

| | | |
|---|---|---|
| 2023/0057900 A1 | 2/2023 | Nelson et al. |
| 2023/0145297 A1 | 5/2023 | Gonen et al. |

FOREIGN PATENT DOCUMENTS

| | | |
|---|---|---|
| WO | WO-2020/112872 A1 | 6/2020 |
| WO | WO-2021/055219 A1 | 3/2021 |
| WO | WO-2021/216799 A1 | 10/2021 |
| WO | WO-2021/237116 A1 | 11/2021 |

OTHER PUBLICATIONS

De la Cruz, M. J. et al. Atomic-resolution structures from fragmented protein crystals with the cryoEM method MicroED. *Nat Methods* 14, 399-402 (2017).
De la Cruz, M. J., Martynowycz, M. W., Hattne, J. & Gonen, T. MicroED data collection with SerialEM. *Ultramicroscopy* 201, 77-80 (2019).
Dick, M., Sarai, N. S., Martynowycz, M. W., Gonen, T. & Arnold, F. H. Tailoring tryptophan synthase TrpB for selective quaternary carbon bond formation. *Journal of the American Chemical Society* 141, 19817-19822 (2019).
Eddleston et al., "Transmission electron microscopy of pharmaceutical materials," Journal of Pharmaceutical Sciences, 99(9): 4072-4082 (2010).
Gallagher-Jones et al., "Sub-angstrom cryo-EM structure of a prion protofibril reveals a polar clasp," Nature Structural & Molecular Biology, 25: 131-134 (2018).
Gonen, T. et al. Lipid-protein interactions in double-layered two-dimensional AQP0 crystals. *Nature* 438, 633-638 (2005).
Gonen, T., Sliz, P., Kistler, J., Cheng, Y. & Walz, T. Aquaporin-0 membrane junctions reveal the structure of a closed water pore. *Nature* 429, 193-197 (2004).
Gruene et al., "Rapid Structure Determination of Microcrystalline Molecular Compounds Using Electron Diffraction," Angewandte Chemie International Edition, 57(50): 16313-16317 (2018).
Halaby, S. et al. Microcrystal Electron Diffraction for Molecular Design of Functional Non-Fullerene Acceptor Structures. *Chem. Mater.* 33, 966-977 (2021).
Hattne et al., "Analysis of Global and Site-Specific Radiation Damage in Cryo-EM," Structure, 26(5): 759-766.e1-4 (2018).
Hattne et al., "MicroED data collection and processing," Acta Crystallographica Section A: Foundation and Advances, 71: 353-360 (2015).
Hattne et al., "MicroED with the Falcon III direct electron detector," IUCrJ: 921-926 (2019).
Hattne et al., "Modeling truncated pixel values of faint reflections in MicroED images," J Appl Crystallogr 49: pp. 1029-1034 (2016).

Henderson., "The potential and limitations of neutrons, electrons and X-rays for atomic resolution microscopy of unstained biological molecules," Quarterly Reviews of Biophysics, 28(2): 171-193 (1995).
Huacuja., "Synthesis and reactivity of unusual palladium (II) complexes supported by a diarylamido/bis(phosphine) PNP pincer ligand," Doctoral Dissertation submitted to the Office of Graduate and Professional Studies of Texas A&M University: 306 pages (2014).
International Search Report and Written Opinion for International Application No. PCT/US2020/050088 mailed Dec. 9, 2020.
International Search Report and Written Opinion for International Application No. PCT/US2021/028534 dated Jul. 22, 2021.
Jones et al., "Characterization of Reactive Organometallic Species via MicroED," ACS Central Science, 5(9): 1507-1513 (2019).
Kolb et al., "Automated electron diffraction tomography—a new tool for nano crystal structure analysis," Crystal Research & Technology, 46(6): 542-554 (2011).
Liu, S. & Gonen, T. MicroED structure of the Nak ion channel reveals a Na+ partition process into the selectivity filter. *Communications biology* 1, 1-6 (2018).
Liu, S. et al. Atomic resolution structure determination by the cryo-EM method MicroED. *Protein Science* 26, 8-15 (2017).
Martynowycz et al., "Ab initio phasing macromolecular structures using electron-counted MicroED data," Nat Methods 19: pp. 724-729 (2022).
Martynowycz et al., "From electron crystallography of 2D crystals to MicroED of 3D crystals," Current Opinion in Colloid & Interface Science, 34: 9-16 (19 pages)(2018).
Martynowycz, M. W. & Gonen, T. Ligand Incorporation into Protein Microcrystals for MicroED by On-Grid Soaking. Structure 29, 88-95.e2 (2021).
Martynowycz, M. W. & Gonen, T. Microcrystal Electron Diffraction of Small Molecules. *J Vis Exp* (2021) doi:10.3791/62313.
Martynowycz, M. W. et al. MicroED structure of the human adenosine receptor determined from a single nanocrystal in LCP. *Proc Natl Acad Sci USA* 118, e2106041118 (2021).
Martynowycz, M. W., Clabbers, M. T. B., Unge, J., Hattne, J. & Gonen, T. Benchmarking the ideal sample thickness in cryo-EM. *Proc Natl Acad Sci USA* 118, e2108884118 (2021).
Martynowycz, M. W., Khan, F., Hattne, J., Abramson, J. & Gonen, T. MicroED structure of lipid-embedded mammalian mitochondrial voltage-dependent anion channel. *Proc Natl Acad Sci USA* 117, 32380-32385 (2020).
Martynowycz, M. W., Zhao, W., Hattne, J., Jensen, G. J. & Gonen, T. Collection of Continuous Rotation MicroED Data from Ion Beam-Milled Crystals of Any Size. *Structure* 27, 545-548.e2 (2019).
Martynowycz, M. W., Zhao, W., Hattne, J., Jensen, G. J. & Gonen, T. Qualitative Analyses of Polishing and Precoating FIB Milled Crystals for MicroED. *Structure* 27, 1594-1600.e2 (2019).
McMullan et al., "Chapter One—Direct Electron Detectors," Methods in Enzymology, 579: 1-17 (2016).
Nannenga et al., "High-resolution structure determination by continuous-rotation data collection in MicroED," Nature Methods, 11: 927-930 (2014).
Nannenga, B. L. & Gonen, T. MicroED opens a new era for biological structure determination. *Current opinion in structural biology* 40, 128-135 (2016).
Nannenga, B. L. & Gonen, T. MicroED: a versatile cryoEM method for structure determination. *Emerging topics in life sciences* 2, 1-8 (2018).
Nannenga, B. L., Shi, D., Hattne, J., Reyes, F. E. & Gonen, T. Structure of catalase determined by MicroED. eLife 3, e03600 (2014).
Palatinus et al., "Hydrogen positions in single nanocrystals revealed by electron diffraction," Science, 355(6321): 166-169 (2017).
Purdy, M. D. et al. MicroED structures of HIV-1 Gag CTD-SP1 reveal binding interactions with the maturation inhibitor bevirimat. *Proc Natl Acad Sci USA* 115, 13258-13263 (2018).
Rodriguez et al., "Structure of the toxic core of alpha-synuclein from invisible crystals," Nature, 525: 486-490 (2015).
Sawaya, M. R. et al. Ab initio structure determination from prion nanocrystals at atomic resolution by MicroED. *Proc Natl Acad Sci USA* 113, 11232-11236 (2016).

(56) References Cited

OTHER PUBLICATIONS

Shi, D. et al. The collection of MicroED data for macromolecular crystallography. *Nature Protocols* 11, 895-904 (2016).
Shi, D., Nannenga, B. L., Iadanza, M. G. & Gonen, T. Three-dimensional electron crystallography of protein microcrystals. *Elife* 2, e01345 (2013).
Ting, C. P. et al. Use of a scaffold peptide in the biosynthesis of amino acid-derived natural products. *Science* 365, 280-284 (2019).
Utsunomiya et al., "Direct Identification of Trace Metals in Fine and Ultrafine Particles in the Detroit Urban Atmosphere," Environmental Science & Technology, 38(8): 2289-2297 (2004).
Van Genderen et al., "Ab initio structure determination of nanocrystals of organic pharmaceutical compounds by electron diffraction at room temperature using a Timepix quantum area direct electron detector," Acta Crystallographica Section A: Foundations and Advances, A72: 236-242 (2016).
Vergara et al., "MicroED Structure of Au146(p-MBA)57 at Sub-atomic Resolution Reveals a Twinned FCC Cluster," The Journal of Physical Chemistry Letters, 8(22): 5523-5530 (2017).
Wisedchaisri, G. & Gonen, T. Fragment-based phase extension for three-dimensional structure determination of membrane proteins by electron crystallography. *Structure* 19, 976-987 (2011).
Wolff. A. M. et al. Comparing serial X-ray crystallography and microcrystal electron diffraction (MicroED) as methods for routine structure determination from small macromolecular crystals. IUCrJ 7, 306-323 (2020).
Zhou et al., "Using focus ion beam to prepare crystal lamella for electron diffraction" Journal of Structural Biology, 205(3): 59-64 (2019).
Zhu, L. et al. Structure Determination from Lipidic Cubic Phase Embedded Microcrystals by MicroED. *Structure* S0969212620302392 (2020) doi:10.1016/j.str.2020.07.006.
Arnold et al., "Blotting-free and lossless cryo-electron microscopy grid preparation from nanoliter-sized protein samples and single-cell extracts," J Struct Biol, 197: 220-226 (2017).
International Search Report and Written Opinion for International Application No. PCT/US2021/033701 mailed Sep. 9, 2021.
Jones et al., "The CryoEM Method MicroED as a Powerful Tool for Small Molecule Structure Determination," ACS Cent Sci, 4: 1587-1592 (2018).
Martynowycz et al., "Collection of Continuous Rotation MicroED Data from Ion Beam-Milled Crystals of Any Size," Structure, 27(3): 545-548 (2019).
Martynowycz et al., "Qualitative analyses of polishing and pre-coating FIB milled crystals for MicroED," Structure, 27: 1594-1600 (2019).

* cited by examiner

METHODS FOR ANALYZING INTERMOLECULAR INTERACTIONS IN MICROCRYSTALS

RELATED APPLICATION

This application is a §371 national-stage application based on PCT/US21/33701, filed on May 21, 2021, which claims a right of priority to and the benefit of the filing date of U.S. Provisional Application No. 63/028,759, filed on May 22, 2020, which is hereby incorporated by reference in its entirety.

STATEMENT OF RIGHTS

This invention was made with government support under GM136508, awarded by the National Institutes of Health. The government has certain rights in the invention.

BACKGROUND

Atomic resolution structures are critical to understanding how proteins and small molecules function. Knowing how the atoms in a molecule are arranged allow for rational design of ligands such as drugs to bind and inhibit unwanted function or otherwise alter the structure or function of the protein. Investigation of protein structures with these small molecule ligands bound is an important part of drug discovery.

Macromolecular crystallography has been adapted to investigate these ligand-protein interactions by incorporating the ligand into the protein crystal lattice by either soaking ligands into crystals or co-crystallizing the protein with the ligand. However, successfully coercing ligands into protein crystals is challenging. Co-crystallization of the protein with the ligand can change the crystallization condition or result in the ligand forming close contacts between protein molecules in the lattice instead of effectively diffusing into the binding site. Therefore, soaking already formed crystals with ligands can be preferable, but still has its drawbacks.

Crystals soaked with ligands will often crack or dissolve as the additional ligand diffuses into the protein lattice. Cracked or dissolved crystals can eliminate the order that allows the crystals to diffract. It is also unknown how deeply or efficiently the ligand will soak into the protein crystals typically used in X-ray diffraction experiments. Ligand will often only partially occupy the protein crystal leading to weak density in its binding location. Another challenge in ligand soaking experiments for macromolecular crystals arises in modeling the weak density that the ligands occupy. Improved methods for studying and analyzing these interactions are needed.

SUMMARY OF THE INVENTION

In some aspects, methods of introducing a small molecule into a crystal of a macromolecule include applying a first sample having the crystal of the macromolecule onto an electron microscopy (EM) grid; and applying a second sample having the small molecule onto the EM grid to introduce the small molecule into the crystal.

In certain aspects, methods of obtaining a microcrystal having a macromolecule and a small molecule from a crystal of the macromolecule include applying a first sample having the crystal of the macromolecule onto an electron microscopy (EM) grid; applying a second sample having the small molecule onto the EM grid to obtain a crystal having the macromolecule and the small molecule; plunging the EM grid into a cryogenic liquid; placing the EM grid into a focused ion beam scanning electron microscope (FIB/SEM); and milling the crystal having the macromolecule and the small molecule in the FIB/SEM using a focused ion beam to obtain a microcrystal having the macromolecule and the small molecule.

In some aspects, methods of determining a structural model for a complex having a macromolecule and a small molecule include, in addition to features of the aspects for obtaining a microcrystal having a macromolecule and a small molecule from a crystal of the macromolecule, placing the microcrystal having the macromolecule and the small molecule into a transmission electron microscope (TEM); collecting a plurality of electron diffraction patterns from the microcrystal; and determining a structural model based on the plurality of electron diffraction patterns.

In certain aspects, methods of identifying a small molecule that complexes with a macromolecule include determining a structural model for a complex, and characterizing the small molecule as one that complexes with the macromolecule based on the structural model. Such aspects can be used in the context of screening a library of small molecules for their binding to a macromolecule.

Further embodiments and details for each of these aspects is presented throughout the disclosure.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

A method for soaking ligands into macromolecule (e.g., protein) crystals (e.g., microcrystals) on EM (e.g., TEM) grids is presented. One or more crystals on the grid are soaked simultaneously using standard cryo-EM vitrification equipment. An embodiment of the method is demonstrated, through the Examples, using proteinase K microcrystals soaked with the 5-amino-2,4,6-triiodoisophthalic acid (I3C) magic triangle. A soaked microcrystal is milled to a thickness of 200 nm using a focused ion-beam, and microcrystal electron diffraction (MicroED) data are collected. A high-resolution structure of the protein with four ligands at high occupancy is determined. Results suggest that soaking ligands into microcrystals may result in a more efficient uptake than in larger crystals that are typically used in drug discovery pipelines.

The discoveries underlying the disclosed methods can be used to introduce a small molecule into a crystal of a macromolecule, to obtain a microcrystal having a macromolecule and a small molecule from a crystal of the macromolecule, to determine a structural model for a complex having a macromolecule and a small molecule, to identify a small molecule that complexes with a macromolecule, and to screen a library of small molecules for their binding to a macromolecule.

Definitions

As used in the description, the words "a" and "an" can mean one or more than one. As used in the claims in conjunction with the word "comprising," the words "a" and "an" can mean one or more than one. As used in the description, "another" can mean at least a second or more.

A "structural model" of a molecule (or compound) is a model of its molecular geometry, and it describes the three-dimensional arrangement of its atoms. For example, in a Cartesian coordinate system for a three-dimensional space, the set of (x, y, z) coordinates for each atom of the molecule would describe the three-dimensional arrangement of the atoms. The structural model of a molecule can describe the three-dimensional arrangement of all of its atoms, or can describe the three-dimensional arrangement of fewer than all of its atoms (e.g., if some atoms, such as hydrogen atoms, have not been resolved due to experimental limitations). In particular, the structural model of a molecule describes the identity (e.g., via an atomic number) and three-dimensional arrangement (e.g., with respect to a chosen reference frame, for example in a Cartesian coordinate system having an atom of the molecule at its center) of at least 60% (e.g., 65%, 70%, 75%, 80%, 85%, 90%, 95%, 100%) of the non-hydrogen atoms of the molecule. The structural model of a molecule can describe the connectivity of the molecule's atoms, and it can identify the molecule; it need not describe a solution conformation of the molecule. It also need not identify the stereochemistry of the molecule (although in some of the disclosed embodiments, it does identify stereochemical information). In addition, the bond lengths and angles need not correspond to those of an average ensemble solution conformation.

The "unit-cell parameters" include the lengths of the three edges of the unit cell. Depending on the type of unit cell, fewer than three values may suffice to describe the unit-cell parameters. For example, for a cubic unit cell, each of the edges would have the same length; thus, a single value for an edge can be sufficient as length information. The unit-cell parameters also include the three angles of the unit cell. As with edges, fewer than three values may suffice to describe the angles for some of the unit-cell types.

The "space group" describes the overall symmetry of the microcrystal, and it can be one of the 230 possible space groups. Exemplary space groups include $P_1$, $P2_12_12$, and $C_2$. For a biological molecule (e.g., peptide), 65 of the 230 space groups can be relevant, since the absence of mirror planes, glide planes, centers of symmetry, or rotation inversion axes in such molecules make the remaining space groups inapplicable. See, e.g., Cantor & Schimmel, *Biophysical Chemistry, Part II: Techniques for the Study of Biological Structure and Function*, p. 736 (W. H. Freeman and Company 1980).

"Collecting" an electron-diffraction pattern includes obtaining (e.g., via recording) a description of the electron-diffraction pattern in any of the available detection means, such as on a film, an image plate, via an indirect charge-coupled device (CCD) detector, via an indirect complementary metal-oxide-semiconductor (CMOS) detector, via direct monolithic active pixel sensors (MAPS) (e.g., based on CMOS technology or pnCCDs), or via a hybrid pixel detector (e.g., HPAD). As further detailed herein, certain embodiments focus on the use of direct electron detectors.

A "cryogenic fluid" is a liquefied gas that can be kept in liquid state at temperatures below −150° C. An exemplary cryogenic fluid is liquid nitrogen.

The term "phase" is used herein in the sense of the phase of the diffracted electrons described as matter behaving as waves having an amplitude as a function of time and space that depends on phase, wavelength, and maximal amplitude.

A "polymorphic form" of a molecule results from an arrangement or conformation of the constituents of its microcrystal that might differ from another microcrystal of the same molecule.

Samples

Crystals of macromolecules can be obtained via standard methods. For example, they can be grown through controlled precipitation from an aqueous solution (e.g., by using ammonium sulfate, by using polyethylene glycol).

In some embodiments, a full electron diffraction pattern set can be collected from a single microcrystal, allowing for the determination of a three-dimensional structural model for the molecule from that single microcrystal without relying on any other microcrystal. The microcrystal can have two of its dimensions (e.g., edges) longer than a micrometer (e.g., 1.1, 1.5, 2, 3, 4, 5, 6, 7, 8, 9, 10 micrometers), while one of its dimensions can be shorter than two micrometers (e.g., 20, 40, 60, 80, 100, 150, 200, 250, 300, 350, 400, 450, 500, 600, 700, 800, 900, 1000, 1500 nanometers). The methods disclosed herein can be used without confirming the presence of the microcrystals beforehand (e.g., via regular human vision or via common light microscopes, which may fail to detect the microcrystals); the samples can be loaded into an electron microscope in order to locate the microcrystals once the sample grid is already in the electron microscope.

The sample can be applied to an electron microscopy grid. Before applying the sample, the electron microscopy grid can be layered with a thin layer of amorphous carbon by evaporating carbon graphite on it (other materials for support can be used such as formvar, silicone monoxide, lacey carbon, and graphene). The electron microscopy grid can be further subjected to glow discharging to improve the way the microcrystals in the sample distribute on the grid. Once the sample is applied to the grid, the grid may further be surrounded by a cryogenic fluid to maintain the microcrystals at a cryogenic temperature for further data collection.

Systems for Determining Structural Models

In some aspects, the methods disclosed herein use electron microscopes (e.g., transmission electron microscopes). Standard electron microscopes can be used, without modification, for carrying out the methods disclosed herein. Some of the sources for obtaining electron microscopy instruments include Thermo Fisher Scientific (168 Third Avenue, Waltham, MA USA 02451); Hitachi High Technologies America, Inc. (10 North Martingale Road, Suite 500, Schaumburg, IL 60173-2295); and JEOL Ltd. (3-1-2 Musashino, Akishima, Tokyo 196-8558, Japan). An electron microscope can be operated at a suitable voltage, for example between 40 kV and 400 kV. Suitability of a voltage can be determined by considering the de Broglie wavelength of the electrons in light of the desired resolution as well as by considering the permissible range of electron doses in light of the tolerable radiation damage. For example, the de Broglie relationship provides the wavelength of an electron as $\lambda = h/(m_e v)$, in which $\lambda$ is the wavelength of the electron, h is the Planck's constant, $m_e$ is the mass of the electron, and v is the velocity of the electron. Given that an electron accelerated by a voltage difference of $\Phi$ in volts will have a kinetic energy of $e\Phi = (½) m_e v^2$, solving the two equations provides the wavelength in Angstroms of the electron in terms of the electron microscope voltage in volts as $\lambda = 12.3/\sqrt{\Phi}$. See, e.g., Cantor & Schimmel, *Biophysical Chemistry, Part II: Techniques for the Study of Biological Structure and Function*, p. 820 (W. H. Freeman and Company 1980). Using this equation, one can determine that the wavelength of the electron would approximate 0.06 Å at a voltage of 40 kV, 0.04 Å at a voltage of 100 kV, 0.03 Å at a voltage of 200 kV, and 0.02 Å at a voltage of 300 kV. Each of these wavelengths is sufficient to resolve the individual atoms of a molecule, and each is shorter than the typical wavelengths of X-rays used in X-ray crystallography.

Some of the particular types of electron microscopes that can be used include Focused Ion Beam (FIB) systems, DualBeam Focused Ion Beam-Scanning Electron Microscope systems (FIB-SEMs), and Transmission Electron Microscopes (TEMs).

Various detectors can be used to record electron diffraction patterns. For example, films, image plates, indirect charge-coupled device detectors, indirect complementary metal-oxide-semiconductor detectors, direct monolithic active pixel sensors, or hybrid pixel detectors can be used. These may be obtained from sources similar to those for electron microscopes, as well as from other sources such as Gatan, Inc. (5794 W. Las Positas Blvd., Pleasanton, CA 94588) (e.g., for CCD or CMOS cameras, as well as for specimen holders) and Electron Microscopy Sciences (P.O. Box 550, 1560 Industry Road, Hatfield, PA 19440) (e.g., for Kodak films). These detectors can be used without modification or without creating any specialized arrangements that differ from those used for traditional transmission electron microscopy (e.g., used in diffraction mode). Although hybrid pixel detectors are more advanced than the other types of detectors in some ways, use of them is not necessary for the methods disclosed herein: any of the commonly available detectors can be used to practice the disclosed methods. For methods that require obtaining structural information quickly however (e.g., within an hour), traditional Kodak films are impractical; thus, in such cases, digital detectors (e.g., indirect CCD, indirect CMOS, direct CMOS or other MAPS, or HPAD) are preferred.

In some embodiments, the used detectors are direct electron detectors or electron counting devices. For example, direct detection devices (DDD) from Gatan Inc. (5794 W. Las Positas Blvd., Pleasanton, CA 94588), FEI (5350 NE Dawson Creek Drive, Hillsboro, Oregon 97124 USA; operating as a subsidiary of Thermo Fisher Scientific), or Direct Electron, LP (13240 Evening Creek Drive, Suite 311, San Diego, CA 92128 USA) can be used. Some of the particular devices include Gatan K2 and K3, FEI/ThermoFisher Falcon 3EC (and newer Thermo Fisher Falcon 4), and Direct Electron DE-20. See generally G. McMullan, A. R. Faruqi, and R. Henderson, Direct Electron Detectors, *Methods in Enzymology* 579:1-17.

Electron microscopy grids can be obtained from Ted Pella, Inc. (P.O. Box 492477, Redding, CA 96049-2477); Millipore Sigma (3050 Spruce St., St. Louis, MO 63103); as well as from Electron Microscopy Sciences (P.O. Box 550, 1560 Industry Road, Hatfield, PA 19440).

Methods of Processing Electron-Diffraction Patterns

In some aspects, the methods used to determine structural models of molecules are the standard ones used in X-ray crystallography. For example, using the collection of programs within the CCP4 suite (available from the World Wide Web at ccp4.ac.uk/), one can index and integrate the reflections (e.g., using iMosflm, xia2/DIALS); reduce the data to a higher quality subset (e.g., using AIMLESS); estimate phases from molecular replacement (e.g., using PHASER, MOLREP); estimate phases using direct methods (e.g., SHELXD); estimate phases using multiple isomorphous replacement (e.g., peakmax, rsps, vecref, vectors); estimate phases using multiwavelength anomalous dispersion (e.g., crossec, rantan, revise); and refine structural models (e.g., using REFMAC5), in addition to performing numerous other steps for determining structural models. The theories underlying these implementations are available through numerous publications (e.g., B. Rupp, *Biomolecular Crystallography: Principles, Practice, and Application to Structural Biology*, (Garland Science, ed. 1, 2009) for biomolecules; G. Taylor, Introduction to Phasing, *Acta Crystallographica Section D* 66:325-38 (2010); K. Cowtan, Phase Problem in X-ray Crystallography, and Its Solution, *Encyclopedia of Life Sciences* 1-5 (2001); and I. Uson & G. M. Sheldrick, Advances in Direct Methods for Protein Crystallography, *Current Opinion in Structural Biology* 9:643-48 (1999) for phasing). For indexing and integration, one can also use XDS, and for direct methods of estimating phases, one can also use SHELXT or SnB. Alternatively, various independently developed scripts can be used for data processing (e.g., those available at cryoem.ucla.edu/pages/MicroED).

Methods of Forming Microcrystals

According to some aspects, methods are disclosed to introduce a small molecule into a crystal of a macromolecule, and to obtain a microcrystal having a macromolecule and a small molecule from a crystal of the macromolecule.

Some of the disclosed methods include applying a first sample having the crystal of the macromolecule onto an electron microscopy (EM) grid; and applying a second sample having the small molecule onto the EM grid to introduce the small molecule into the crystal, e.g., by diffusion. In some embodiments, the grid can contain more than one crystal, which would enable introducing the small molecule into more than one crystal via one process. This contrasts with the traditional method of soaking a crystal, one at a time, into a solution of the small molecule. The application steps can be performed on the carbon-coated side of the EM grid, and blotting, for example with a filter paper, can be performed on the other side (e.g., the copper side). Any of the steps/methods can be under cryogenic conditions (e.g., with the sample/grid in liquid nitrogen).

The steps, when performed, can be performed for various durations. For example, each of the blotting after application of the first sample, the incubation of the second sample once it is applied, and the blotting after the application of the second sample can be for 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 seconds.

Some of the disclosed methods include placing the EM grid into a focused ion beam scanning electron microscope (FIB/SEM); and milling the crystal having the macromolecule and the small molecule in the FIB/SEM using a focused ion beam to obtain a microcrystal having the macromolecule and the small molecule. The crystal can be milled to have a dimension that is less than a certain thickness, for example less than 100, 150, 200, 250, 300, 350, or 400 nanometers. Before the milling, some methods include depositing platinum on the crystal having the macromolecule and the small molecule by sputter coating the grid.

Methods of Processing Microcrystals

In some aspects, the disclosure relates to methods of determining a structural model for a complex having a macromolecule and a small molecule, of identifying a small molecule that complexes with a macromolecule, and of screening a library of small molecules for their binding to a macromolecule.

Some of these methods rely on forming a microcrystal as described in the previous section, for example via milling in a FIB/SEM. Such a microcrystal can be placed into a transmission electron microscope (TEM), and electron diffraction patterns from the microcrystal can be collected. Thereafter, a structural model can be determined using suitable methods, for example such as those detailed in the Methods of Processing Electron-diffraction Patterns section.

The collection of electron diffraction patterns can include continuously rotating the EM grid in the TEM. In various embodiments, the microcrystal is rotated around the axis by at least 1, 5, 10, 15, 20, 25, 30, 35, 40, 45, 50, 55, 60, 65, 70, 75, 80, 85, 90, 95, 100, 105, 110, 115, 120, 125, 130, 135, or 140 degrees, or by any value/range between these values. The diffraction patterns, in some embodiments, are collected not from the whole microcrystal, but from a portion of it (e.g., the portion that has been milled to have a suitable thickness). The diffraction patterns can be collected using an electron beam in a direction orthogonal to the milling direction.

The disclosed methods for determining a structural model, in conjunction with the disclosed methods for introducing a small molecule into a crystal of a macromolecule and the disclosed methods for milling such a crustal, can be used to identify a small molecule that binds to the macromolecule and to identify how such a binding occurs (e.g., the stoichiometry of binding, the sites of binding). Such an identification can be in the context of a high-throughput drug discovery using MicroED, for example for drug molecules that affect the function of the macromolecule.

EXAMPLES

Example 1: Efficient, High-Throughput Ligand Incorporation into Protein Microcrystals by On-Grid Soaking A method for soaking ligands into protein microcrystals on TEM grids is presented. Every crystal on the grid is soaked simultaneously using only standard cryoEM vitrification equipment. The method is demonstrated using proteinase K microcrystals soaked with the 5-amino-2,4,6-triodoisophthalic acid (I3C) magic triangle. A soaked microcrystal is milled to a thickness of 200 nm using a focused ion-beam, and microcrystal electron diffraction (MicroED) data are collected. A high-resolution structure of the protein with four ligands at high occupancy is determined. Results suggest that soaking ligands into microcrystals may result in a more efficient uptake than in larger crystals that are typically used in drug discovery pipelines.

INTRODUCTION

Atomic resolution structures are critical to understanding how proteins and small molecules function. Crystal structures of small molecule pharmaceuticals are also important to determine how drugs are formulated in their delivery (Datta & Grant, 2004). Knowing how the atoms in a molecule are arranged allow for rational design of ligands such as drugs to bind and inhibit unwanted function (He et al., 2010; Daga et al., 2010). Investigation of protein structures with these small molecule ligands bound is an important part of drug discovery (Kuhn et al., 2002; Tickle et al., 2004; Blundell, 2017). Macromolecular crystallography has been adapted to investigate these ligand-protein interactions by incorporating the ligand into the protein crystal lattice by either soaking ligands into crystals or co-crystallizing the protein with the ligand (Beck et al., 2009). Successfully coercing ligands into protein crystals is challenging (McNae et al., 2005). Co-crystallization of the protein with the ligand can change the crystallization condition or result in the ligand forming close contacts between protein molecules in the lattice instead of effectively diffusing into the binding site (Reynolds, 2014). Soaking already formed crystals with ligands is the standard approach (Beck et al., 2009; Lebioda & Zhang, 1992; López-Jaramillo et al., 2002). Crystals soaked with ligands will often crack or dissolve as the additional ligand diffuses into the protein lattice. Cracked or dissolved crystals can eliminate the order that allows the crystals to diffract. It is also unknown how deep or efficiently the ligand will soak into the large protein crystals typically used in X-ray diffraction experiments. Ligand will often only partially occupy the protein crystal leading to weak density in its binding location. A large challenge in ligand soaking experiments for large macromolecular crystals arises in modeling the weak density that the ligands occupy (Pozharski et al., 2013; Liebschner et al., 2017; Pearce et al., 2017).

Microcrystal electron diffraction (MicroED) is an electron cryo-microscopy (cryoEM) method for determining atomic resolution structures from protein microcrystals in a transmission electron microscope (Shi et al., 2013; Nannenga, Shi, Leslie et al., 2014; Nannenga, Shi, Hattne et al., 2014). MicroED has been used to solve novel protein and small molecule pharmaceutical crystal structures (Jones et al., 2018; Sawaya et al., 2016; Rodriguez et al., 2015). Previous ligand-protein interactions determined using MicroED relied on co-crystallization of the protein and ligand prior to applying the crystals to the grid (Purdy et al., 2018; Seidler et al., 2018; Clabbers et al., 2020). In this way, novel co-crystals of the HIV-GAG bevirimat complex were determined (Purdy et al., 2018). The first-generation HIV-I maturation inhibitor bevirimat was found to occupy the six-fold axis of the protein hexamer along the c axis of the unit cell. The density suggested that the drug bound non-specifically in this position to any of the six protein interfaces, and served as a non-specific inhibitor of the protein capsid, ultimately preventing maturation of the viral capsid. A recent investigation of protein microcrystals using MicroED was also able to correctly locate the inhibitor acetazolamide (AZM) in the active site of human carbonic anhydrase isoform II (HCA II) that it had been co-crystallized with (Clabbers et al., 2020). Other drug discovery efforts utilizing MicroED did not utilized ligand-protein interactions. For example, MicroED was used to determine structures of fibrillar segments of human tau protein. These structures were used to template the beta sheet interface and ultimately design a peptide inhibitor to fibril formation (Seidler et al., 2018). No crystals of this fibril inhibitor complex could be determined since fibrils were no longer formed when incubated together. Time resolved experiments that expose the protein to stimuli just prior to vitrification for cryoEM imaging were similarly pioneered by Unwin (Unwin, 1995).

We demonstrate here a simple, high-throughput method for soaking ligands into protein microcrystals on a TEM grid. The method involves first applying crystals to a grid similarly to any other cryoEM experiment, back blotting, adding the ligand solution, and back blotting again prior to plunging into liquid ethane. This method is demonstrated by on-grid soaking the I3C magic triangle ligand into microcrystals of proteinase K. On-grid soaking is coupled with cryo-FIB milling which removes any excess material and increases the quality of data from the selected crystal. CryoFIB milling also allows investigation of ligand soaked protein crystals of any size, that greatly expands the scope of the method. Our data shows that the I3C ligand soaks into the crystals with higher efficiency when compared to using much larger macromolecular crystals under similar conditions. These results have far-reaching implications in future investigations utilizing MicroED for drug discovery. The approach may also serve as a platform for soaking experiments of interest in other cryoEM modalities, such as single particle or cryotomography.

Results

Soaking the Ligand into the Crystals

Figure 1:
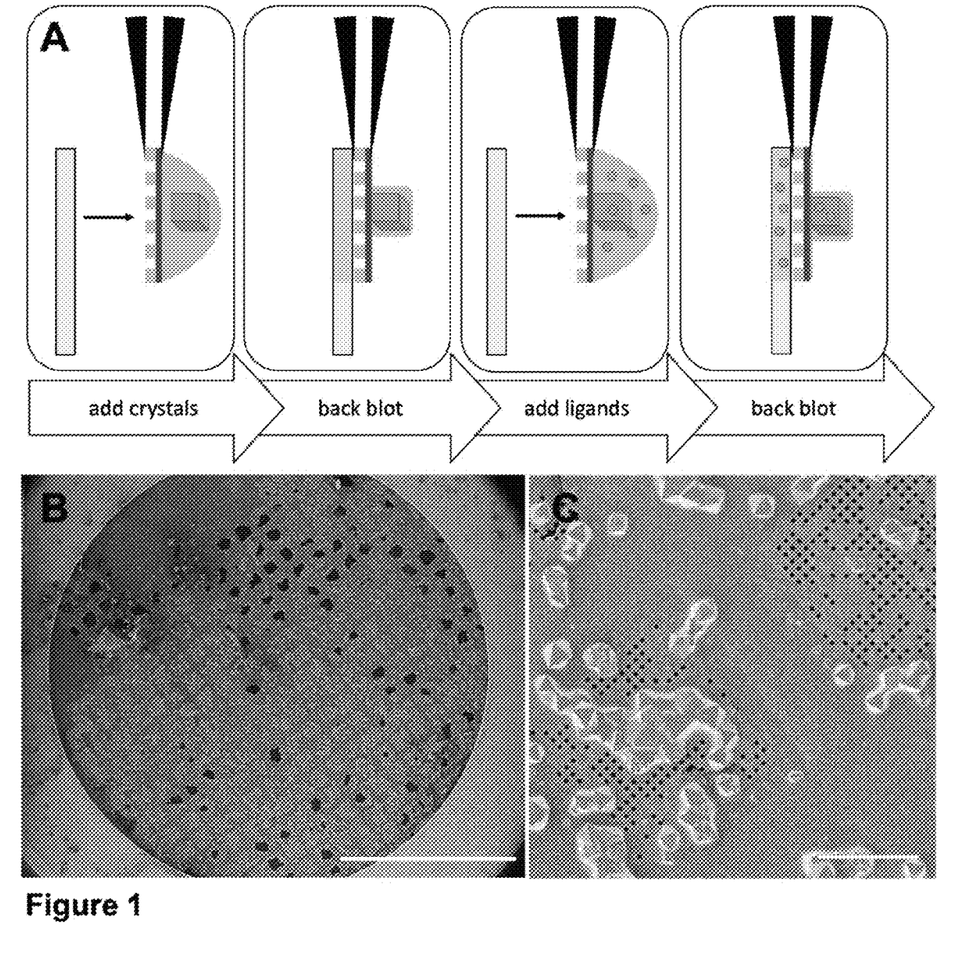
FIG. 1. On-grid soaking of ligands into protein microcrystals. (A) Schematic cartoon of the on-grid soaking procedure. From left to right: protein solution is applied to the carbon side of a glow-discharged holey carbon film, the grid is blotted from the back in high humidity for ~20 s, the ligand solution is applied to the same grid and allowed to incubate for 20 s, the grid is blotted from the back again for ~20 s. The grid is then vitrified by plunging into liquid ethane and stored in liquid nitrogen. (B) SEM image of a grid after on-grid soaking of proteinase K crystals with I3C solution with hundreds of crystals to be potentially investigated. (C) High resolution SEM image showing crystal density and distribution. Scale bar 1 mm in (B) and 50 μm in (C).

Proteinase K crystals were grown in batch to an average size of 1-20 um. Crystal slurry was applied by a pipette to the carbon side of the grid, and the grid was blotted from the back inside a temperature and humidity controlled blotting chamber. In this way, the liquid flows through the holes of the holey carbon film and the crystals remain behind. The grid essentially acts as a filter for the crystals. To the grid of blotted crystals, I3C magic triangle was added to the grid and allowed to incubate. This step is mimetic of soaking a looped crystal into a ligand solution. The grid was blotted from the back again, and immediately plunged into liquid ethane (FIG. 1). The grids were then transferred to either a Thermo-Fisher Aquilos dual beam FIB/SEM or a Thermo-Fisher Talos *Arctica* TEM for inspection (FIG. 1).

Identification and Selection of Ligand Soaked Crystals

Crystals on the TEM grid were identified in the SEM after platinum coating. The crystal density was high with crystals being present on both the thin carbon film and the film above the copped grid bars (FIG. 1). A crystal was identified in both SEM and FIB imaging (FIG. 2) as a cluster of two crystals directly next to one another in the approximate center of a grid square, with the front and back crystals measuring approximately 5 µm and 10 µm across, respectively. The view of the back crystal was occluded in the FIB image at 18° by another crystal near the grid bar.

Cryo-FIB Milling

Figure 2:
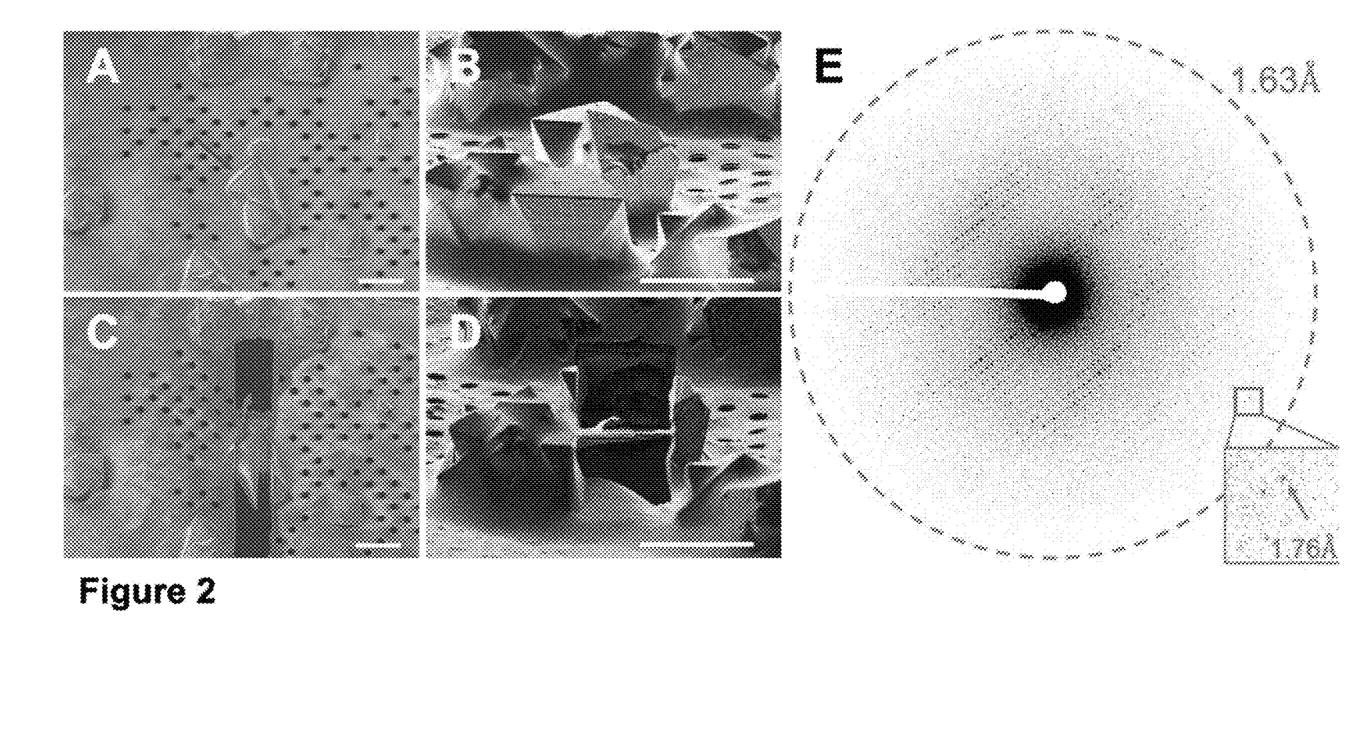
FIG. 2. Cryo-FIB milling of a proteinase K microcrystal soaked with I3C. (A) SEM and (B) FIB images of a 10 μm protein crystal before cryo-FIB milling. The crystal after milling the back crystal to a thickness of 200 nm imaged using the (C) SEM and (D) FIB. (E) The resulting diffraction from this lamella at 0° for 1 s. Inset showing visible high resolution spots. Scale bars 10 μm in all images. Red arrow indicates crystal selected for investigation.

The occluding crystals in front of and abutting the crystal of interest were milled through in order to access the crystal furthest behind the rest (FIG. 2). Rough milling was done in cleaning cross sections from both the top and bottom of the desired lamella location. A final thickness of approximately 200 nm was achieved after two polishing steps using a very low gallium beam current.

MicroED Data Collection

The grid was transferred to a Talos *Arctica* TEM for MicroED data collection. Crystal lamellae were identified by taking a low-magnification montage. The target lamella appeared as a long streak of white with a semitransparent lamella suspended in the gap. The crystal was screened for diffraction by collecting a single diffraction image at 0° for 1 s using a 70 µm aperture in order to isolate the signal from a small area on the desired crystal. Diffraction spots to >2 Å were observed (FIG. 2). A continuous rotation MicroED data set was collected between −30 to +30°.

MicroED Data Analysis

MicroED data were indexed, integrated, and scaled in DIALS as described (Hattne et al., 2015; Parkhurst et al., 2016; Clabbers et al., 2018; Winter et al., 2018; Waterman et al., 2016). A resolution cutoff was applied after integration at 1.78 Å, where the $CC_{1/2}$ fell to a value of 0.33. This dataset from a single crystal was found to have an overall completeness of 94.5%, a I/σ I of 7.8, and $R_{pim}$ of 14%.

Structure Determination and Modeling

Figure 3:
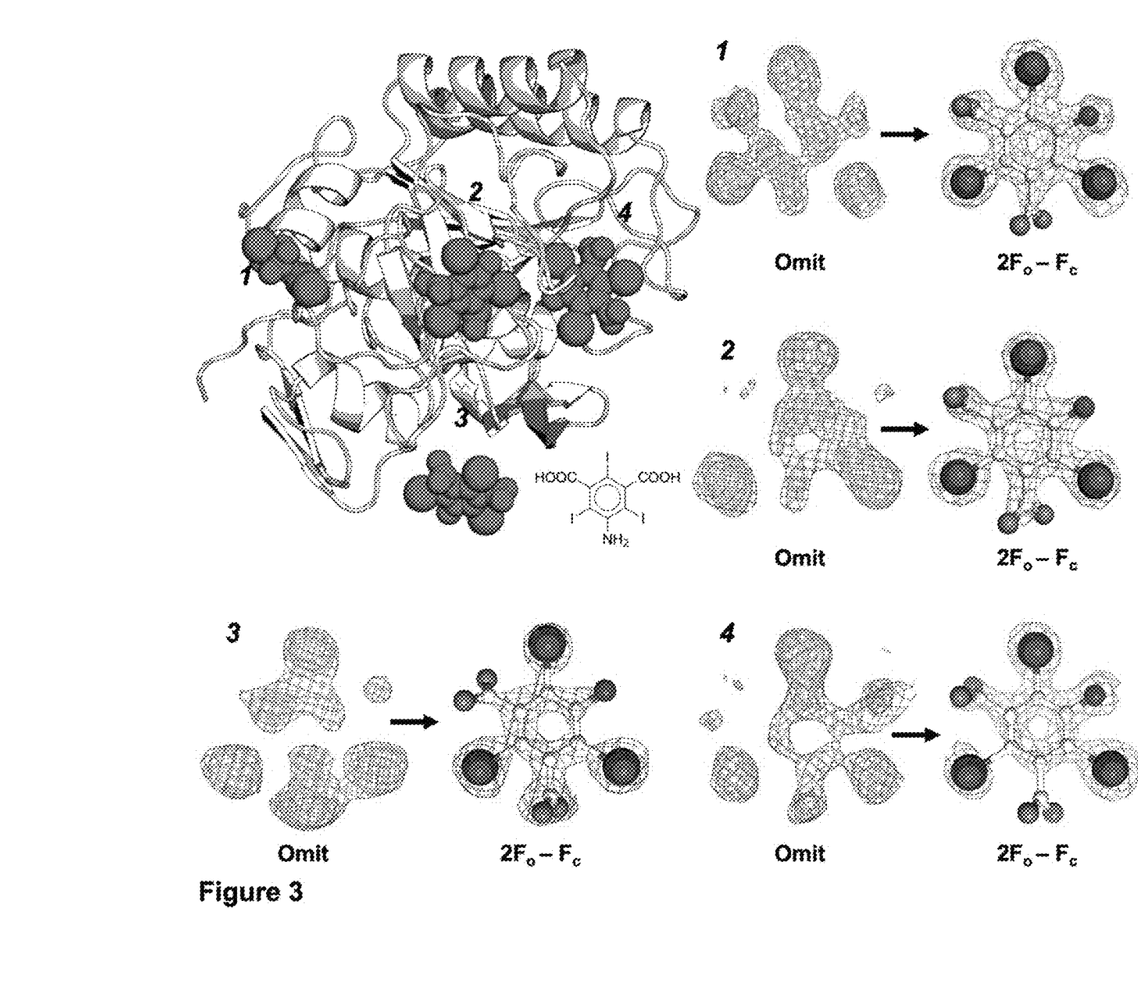
FIG. 3. I3C ligands soaked into the protein lattice. (Top Left) Cartoon representation of the determined protein (beige) and the identified ligand binding sites as sticks and spheres colored by element. (Right and bottom) corresponding numbered sites with their densities before modeling (left side), and after the ligand was modeled and refined (right). Blue meshes are $2F_o$-$F_c$ maps contoured at the 1.00 level, and green meshes are $F_o$-$F_c$ maps contoured at the 3σ levels. The iodine atoms form an equilateral triangle with side lengths ~6 Å.

Molecular replacement was performed using the proteinase K model with PDBID 6CL7 to determine the structure (McCoy et al., 2007). This model of proteinase K contains no solvent or ions in the model, making it an ideal for molecular replacement when looking for ligands. A single, unambiguous solution in P $4_3$ $2_1$ 2 was found. The initial solution from molecular replacement was inspected for differences in the density corresponding to ligands. We found >25 peaks in the $F_o$-$F_c$ map with values >6σ. From these peaks, four I3C ligands could be immediately identified in both the $2F_o$-$F_c$ and $F_o$-$F_c$ maps (FIG. 3). Prior to placing and refining the molecules, the rings of the I3C molecules were apparent—in some cases even without lowering the contour levels. The quality of these maps made for simple, unambiguous identification of the ligand molecules without any special treatment (such as Polder maps) of the density.

Structure Refinement

After placing the four I3C ligands, the structure was refined and solvent molecules were added automatically. Another round of refinement was conducted that allowed the occupancy of the I3C molecules to vary. The four I3C ligands were found to have occupancies between 58 and 75%, with average B-factors of 20 Å$^2$. These B-factors are approximately equal to that of the modeled solvent atoms, and slightly higher than the average B-factor of the protein, or 13 Å$^2$. The entire model was refined using individual B-factors, rather than group B-factors for the ligands, attesting to the quality of the data. Detailed data collection and refinement statistics are presented in Table 1.

DISCUSSION

Figure 4:
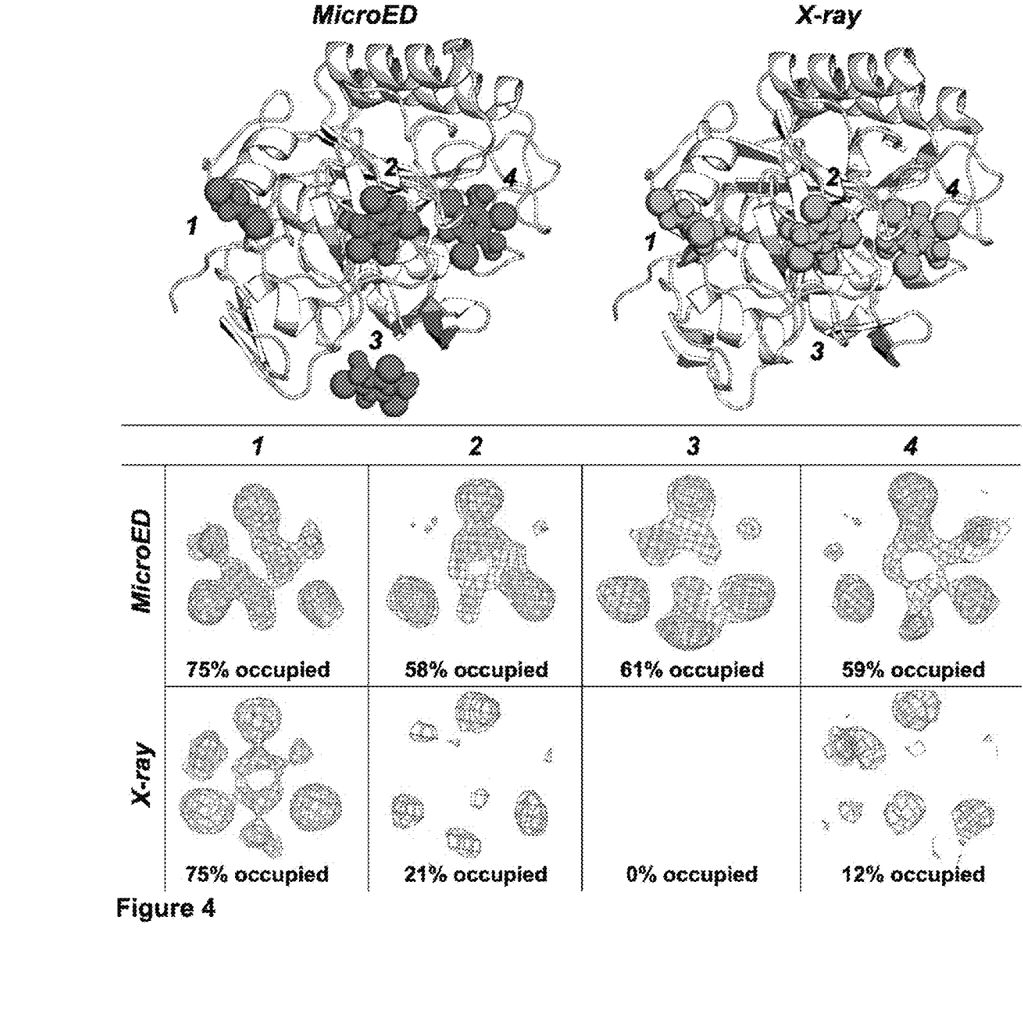
FIG. 4. Comparison of ligand placement between a microcrystal determined by MicroED and a large crystal determined using X-ray diffraction. (Top left) MicroED (beige) and X-ray determined (light blue) structures overlaid with their bound ligands. The overall Cα RMSD between the models is 0.18 Å. (Right and bottom) For each numbered ligand, the corresponding $2F_o$-$F_c$ and $F_o$-$F_c$ densities using only the protein phases are shown with the MicroED on the left and X-ray on the right for comparison. Ligand 3 in the X-ray structure was not observed. All $2F_o$-$F_c$ maps are contoured at the 1 s level, and $F_o$-$F_c$ maps are contoured at the 3 s level. Maps are presented with a 1.75 Å carve for clarity. Density maps for each are calculated at 1.78 Å resolution.

It has been suggested that the soaking kinetics of ligands into protein crystals should be more efficient for smaller crystals. Our results corroborate this assumption. Soaking I3C into proteinase K crystals ~200 μm across under the same conditions that were then investigated using a rotating anode home source resulted in a similarly high resolution of 1.76 Å (Beck et al., 2010). This X-ray investigation located 3, I3C molecules with occupancies between 12-75% in the proteinase K asymmetric unit. These molecules could be unambiguously identified by the triangular arrangement of iodine atoms. Our experiment showed an unambiguous additional I3C ligand off of Arg290. This site is similar to a site occupied in a brominated analogue to the I3C magic triangle in similarly sized crystals that were soaked in an even higher concentration in this X-ray investigation. The occupancy of the four I3C ligands found in our investigation was higher than that in the X-ray investigation that used large crystals, 58-75% vs. 12-75%. The ligands in our experiment also had similarly low B-factors for of only 20 Å$^2$. The density of all four of the 13C just after molecular replacement were clear without any modelling, whereas the densities in the X-ray structure were difficult to interpret without refinement (FIG. 4). Our data suggest that ligands such as I3C may soak into much smaller crystals more efficiently without sacrificing map quality or resolution.

Investigating ligand-protein interactions using on-grid soaking has several advantages to typical macromolecular X-ray crystallography ligand soaking pipelines. By initially placing an entire crystallization drop on the grid, many crystals are added to the grid at once, and then all soaked simultaneously. Traditionally, crystals had to be individually looped, soaked into a high concentration ligand solution, back soaked into a cryo-protective solution, and then plunged into liquid nitrogen. This approach requires a high degree of dexterity and has multiple points of failure from operator error. Our method soaks all the crystals at once, requires no manual manipulation of the individual crystals, and does not require a cryo-protective back soak, since properly vitrified crystals show no ice rings (FIG. 2). We demonstrate our method on a crystal only 10 μm across at its widest. Crystals of this size also pose a considerable challenge to accurately fish out with a nylon loop and optimally shoot at synchrotron end stations without microfocus capabilities.

The additional step of a dual beam FIB/SEM to this method adds significant utility. Milling protein crystals has recently seen a high amount of interest for preparing crystals that are too small for synchrotron X-ray experiments, but still too large for MicroED. By milling the ligand soaked crystals we are no longer limited to crystals that happen to be in thin ice and happen to be smaller than 1 μm thick, though this method is still tractable when a FIB/SEM is unavailable by means of crystal fragmentation (Martynowycz et al., 2017; de la Cruz et al., 2017). Using the FIB/SEM, even crystals large enough for synchrotron or home source X-ray experiments become amenable to our method, while avoiding the laborious looping and plunging steps. Milling crystals also reduces the background contributed from the vitreous ice layer and carbon film surrounding crystals on TEM grids. Soaking microcrystals on TEM grids may even prove to be a preferable emerging method for synchrotron X-ray investigations. Recent results have shown that vitrified protein microcrystals on TEM grids can been located ahead of time using an SEM, and then subsequently used for X-ray diffraction experiments. We also envision applications to single particle cryoEM and cryotomography workflows where active compounds are added on-grid and allowed to interact just before vitrification, allowing for time resolved investigations of ligand activity on varying scales.

The I3C magic triangle was chosen to demonstrate on-grid crystal soaking because it has a combination of amine and carboxyl groups. These exposed groups make the triangle highly hydrophilic, and more likely to incorporate into the crystal. Other ligands such as small molecule drugs may be more hydrophobic and may not soak into the crystals as well. The I3C ligand was designed for phasing in-house macromolecular protein crystal structures using X-ray diffraction, since the anomalous signal from iodine at the wavelength of a standard Cu Kα of 1.54 Å is particularly high (Beck et al., 2008, 2009, 2010). There is no similarly strong anomalous signal in MicroED experiments, and the zero degree scattering amplitude from iodine is only marginally stronger than that of carbon (11 vs 2.5) compared to X-ray diffraction experiments (53 vs 6) (Colliex et al., 2006). This compounded with the lack of anomalous signal suggests that the 13C magic triangle may not be particularly useful for phasing MicroED data. Though recent investigations have demonstrated phasing MicroED data using isomorphous differences is plausible, an experimentally phased protein structure has yet to be demonstrated (Martynowycz et al., 2020). It is likely that incorporations of heavy atoms using the on-grid soaking method will prove invaluable to this effort.

Quantitative experiments investigating crystal size, soaking efficiency, and effects on protein-ligand interacts is an avenue for exciting future investigations. On a single grid, crystals can be found in a variety of sizes (FIG. 1). Since all the crystals on the grid have been subjected to the same soaking condition without differences between operators or soaking techniques, a systematic investigation of different crystal sizes and ligand occupancies would be of great potential interest. Furthermore, cryo-FIB milling of ligand soaked crystals in specific regions of individual crystals provides a unique opportunity for investigation that may not be possible using traditional means. In this way, it may be possible to determine whether the occupancy of ligands in very large crystals depends on the where crystals are milled-near the edge or middle.

CONCLUSIONS

We present a method for high throughput, on-grid soaking of ligands into protein microcrystals that is fast, simple, and effective. On-grid soaking of protein microcrystals is demonstrated and shown to effectively incorporate ligands. The results suggest that soaked microcrystals of the same protein-ligand complex have higher occupancy and number of ligands bound than using a much larger crystal required for X-ray scattering experiments. This method can be used on current cryoEM hardware for sample preparation and data collection workflows. Adding an additional milling step in a FIB/SEM expands the scope of the method to macromolecular protein crystals of any size, potentially even synchrotron X-ray investigations. Our approach has implications for drug discovery, the investigation of protein-ligand interactions, and investigating the properties of how ligands interact with and flow through crystals.

Example 2: Materials and Methods for Example 1

Materials

Proteinase K (E. Album) was purchased from Sigma and used without further purification. 5-amino-2,4,6-triiodo-isophthalic acid (I3C) magic triangles were purchased from Hampton and prepared as described (Beck et al., 2010).

Crystallization

Proteinase K crystals were grown in batch by dissolving 5 mg of lyophilized proteinase K powder into 1 mL of 1.25M ammonium sulfate at 4° C. Crystals between 1-50 µm were formed within one day, and typically crystals were visible under the light microscope within minutes. The crystal soaking solution was 1.25M ammonium sulfate 0.1M I3C.

Grid Preparation

Quantifoil R2/2 Cu200 grids were glow discharged for 30 s immediately prior to use. Grids were loaded on to a Leica GP2 cryo-plunger inside of a cold room held at 4° C. and 35% relative humidity. The blotting chamber was set to 4° C. and 90% humidity. Filter paper was added prior to use, and the system was allowed to equilibrate for 15 mins prior to use. Grids were loaded into the plunger and 3 µL of proteinase K slurry were applied to the carbon side (front) of the grid and allowed to incubate with the protein drop for 30 s. The grid was then gently blotted from the back (copper side) for 20 s. After blotting, 3 µL of the crystal soaking solution (1.25M ammonium sulfate, 0.1M I3C) was added to the same grid and allowed to incubate again for 20 s. The grids were then blotted again from the back for 20 s and immediately plunged into liquid ethane and transferred to liquid nitrogen for storage.

Cryo-FIB Milling of the Protein Crystals

Stored grids were clipped with the carbon facing side up and transferred into a cryogenically cooled Thermo-Fisher Aquilos dual beam FIB-SEM for milling. Grid clips were marked with a dot on the top with a sharpie to indicate the milling direction. A thin layer of platinum (~10 nm) was deposited on the grids by sputter coating prior to inspecting the grids using the SEM (Martynowycz et al., 2019b). An additional layer (~300 nm) of carbon-rich platinum was added on top of this using the gas injection system. We applied the GIS platinum layer in the mapping position to prevent shadowing of the platinum layer and opened the GIS valve at 12 mm rather than 7 mm in order to have a slower, more controlled deposition. Crystals were identified in the SEM and FIB, brought to eucentric height, and milled using cleaning cross sections in steps into lamellae until a thickness of ~200 nm as described (Martynowycz et al., 2019a; Duyvesteyn et al., 2018). The final polishing step used a gallium beam current of 10 pA to remove the last few nm of crystal from the lamellae (Martynowycz et al., 2019b).

MicroED Data Collection

MicroED data collection was performed very similarly to previous experiments (Martynowycz et al., 2019a,b; Hattne et al., 2015, 2018; Jason de la Cruz et al., 2019; Hattne et al., 2019). Grids with milled crystals were transferred to a Thermo-Fisher Talos *Arctica* transmission electron microscope after rotating the grids by 90°. Rotation by 90° assures the tilt axis during MicroED data collection is perpendicular to the milling direction, allowing for a greater rotation range of the crystal lamellae. The TEM was operated at liquid nitrogen temperature at an accelerating voltage of 200 kV. Data were collected between the real space wedge between −30 and +30° at a rate of 0.25°/s. Frames were read out every 1 s and binned by 2. The total exposure to the crystal lamellae was 2.4 $e^-Å^{-2}$. The diffraction distance was set to 1900 mm which corresponds to a crystal to detector distance of 1853 mm after taking post-column magnification into account. Camera length was calibrated using diffraction from a molybdenum film prior to loading the protein grid and to check for any distortions in the diffraction (Clabbers et al., 2018, 2017).

MicroED Data Processing

Data were converted from MRC to SMV format as described, and an ADSC offset of 512 was applied to compensate for negative bias and pixel truncation (Hattne et al., 2016). The data were indexed, integrated, and scaled in DIALS using the general linear background model using a frame pedestal of 512 and a detector gain of 14 (Clabbers et al., 2018; Parkhurst et al., 2016). A resolution cutoff of 1.78 Å was selected by the $CC_{1/2}=0.33$ criterion (Evans & Murshudov, 2013; Karplus & Diederichs, 2012). The structure was determined by molecular replacement in PHASER using the search model PDB 6CL7 using electron scattering factors (Hattne et al., 2018; McCoy et al., 2007). The TFZ and LLG of the solution were 69.1 and 6856, respectively. Four I3C molecules were visible in the density prior to any refinement or modeling. These are apparent as the I-I distance is known to be ~6 Å (Beck et al., 2008). The four I3C molecules were placed manually in COOT using the get monomer command using the three letter code I3C (Emsley & Cowtan, 2004). The structure was refined in Phenix.refine after creating restraints in Elbow as described (Moriarty et al., 2009; Afonine et al., 2012). The final model was refined using individual isotropic B-factors for the protein, solvent molecules, and I3C molecules. Occupancy was allowed to vary for the I3C molecules.

Figures and Tables

Figures were arranged in Microsoft Powerpoint. Images were adjusted and cropped in FIJI (Schindelin et al., 2012). Tables were arranged in Microsoft Excel. Protein models and meshes were generated using PyMol (Schrödinger LLC, 2014).

Table(s)

TABLE 1

Refinement statistics for a proteinase K microcrystal soaked with 13C. Proteinase K soaked on-grid with 13C

| | |
|---|---|
| Wavelength (Å) | 0.0251 |
| Resolution range (Å) | 43.32-1.78 (1.844-1.78) |
| Space group (#) | P $4_32_12$ |
| Unit cell (a = b, c, α = β = γ) | 67.55, 102.77, 90 |
| Total reflections | 109326 (10458) |
| Multiplicity | 4.9 (4.8) |
| Completeness (%) | 94.52 (94.56) |
| Mean I/sigma(I) | 7.83 (2.19) |
| Wilson B-factor | 14.37 |
| $R_{merge}$ | 0.2622 (0.9953) |
| $R_{pim}$ | 0.1304 (0.5076) |
| $CC_{1/2}$ | 0.971 (0.365) |
| $R_{work}$ | 0.1694 |
| $R_{free}$ | 0.2094 |
| Number of non-hydrogen atoms | 2339 |
| macromolecules | 2029 |
| ligands | 64 |
| solvent | 246 |
| RMS (bonds) | 0.005 |
| RMS (angles) | 0.74 |
| Ramachandran favored (%) | 97.83 |

TABLE 1-continued

Refinement statistics for a proteinase K microcrystal soaked with 13C.
Proteinase K soaked on-grid with 13C

| | |
|---|---|
| Ramachandran allowed (%) | 2.17 |
| Ramachandran outliers (%) | 0 |
| Rotamer outliers (%) | 0 |
| Clashscore | 5.21 |
| Average B-factor | 13.51 |
| macromolecules | 12.59 |
| ligands | 19.44 |
| solvent | 19.61 |

REFERENCES

Afonine, P. V., Grosse-Kunstleve, R. W., Echols, N., Headd, J. J., Moriarty, N. W., Mustyakimov, M., Terwilliger, T. C., Urzhumtsev, A., Zwart, P. H. & Adams, P. D. (2012). *Acta Crystallogr. Sect. D Biol. Crystallogr.* 68, 352-367.

Beck, T., Da Cunha, C. E. & Sheldrick, G. M. (2009). *Acta Crystallogr. Sect. F Struct. Biol. Cryst. Commun.* 65, 1068-1070.

Beck, T., Gruene, T. & Sheldrick, G. M. (2010). *Acta Crystallogr. Sect. D Biol. Crystallogr.* 66, 374-380.

Beck, T., Krasauskas, A., Gruene, T. & Sheldrick, G. M. (2008). *Acta Crystallogr. Sect. D Biol. Crystallogr.* 64, 1179-1182.

Blundell, T. L. (2017). *IUCrJ.* 4, 308-321.

Clabbers, M. T. B., Fisher, S. Z., Coincon, M., Zou, X. & Xu, H. (2020). *BioRxiv Mol. Biol.*

Clabbers, M. T. B., van Genderen, E., Wan, W., Wiegers, E. L., Gruene, T. & Abrahams, J. P. (2017). *Acta Crystallogr. Sect. D Struct. Biol.* 73, 738-748.

Clabbers, M. T. B., Gruene, T., Parkhurst, J. M., Abrahams, J. P. & Waterman, D. G. (2018). *Acta Crystallogr. Sect. D Struct. Biol.* 74, 506-518.

Colliex, C., Cowley, J. M., Dudarev, S. L., Fink, M., Gjønnes, J., Hilderbrandt, R., Howie, A., Lynch, D. F., Peng, L. M., Ren, G., Ross, a W., Smith, V. H., Spence, J. C. H., Steeds, J. W., Wang, J., Whelan, M. J. & Zvyagin, B. B. (2006). *International Tables for Crystallography*, Vol. C, pp. 259-429. Chester, England: International Union of Crystallography.

Daga, P., Patel, R. & Doerksen, R. (2010). *Curr. Top. Med. Chem.* 10, 84-94.

Datta, S. & Grant, D. J. W. (2004). *Nat. Rev. Drug Discov.* 3, 42-57.

Duyvesteyn, H. M. E., Kotecha, A., Ginn, H. M., Hecksel, C. W., Beale, E. V., de Haas, F., Evans, G., Zhang, P., Chiu, W. & Stuart, D. I. (2018). *Proc. Natl. Acad. Sci.* 115, 9569-9573.

Emsley, P. & Cowtan, K. (2004). *Acta Crystallogr. Sect. D Biol. Crystallogr.* 60, 2126-2132.

Evans, P. R. & Murshudov, G. N. (2013). *Acta Crystallogr. Sect. D Biol. Crystallogr.* 69, 1204-1214.

Hattne, J., Martynowycz, M. W., Penczek, P. A. & Gonen, T. (2019). *IUCrJ.* 6, 921-926.

Hattne, J., Reyes, F. E., Nannenga, B. L., Shi, D., De La Cruz, M. J., Leslie, A. G. W. & Gonen, T. (2015). *Acta Crystallogr. Sect. A Found. Adv.* 71, 353-360.

Hattne, J., Shi, D., Glynn, C., Zee, C.-T. C.-T., Gallagher-Jones, M., Martynowycz, M. W. M. W., Rodriguez, J. A. J. A. & Gonen, T. (2018). *Structure.* 26, 759-766.e4.

Hattne, J., Shi, D., De La Cruz, M. J., Reyes, F. E. & Gonen, T. (2016). *J. Appl. Crystallogr.* 49, 1029-1034.

He, Z., Zhang, J., Shi, X.-H., Hu, L.-L., Kong, X., Cai, Y.-D. & Chou, K.-C. (2010). *PLOS One.* 5, e9603.

Jason de la Cruz, M., Martynowycz, M. W., Hattne, J. & Gonen, T. (2019). *Ultramicroscopy.* 201, 1-4.

Jones, C. G., Martynowycz, M. W., Hattne, J., Fulton, T. J., Stoltz, B. M., Rodriguez, J. A., Nelson, H. M. & Gonen, T. (2018). *ACS Cent. Sci.* 4, 1587-1592.

Karplus, P. A. & Diederichs, K. (2012). *Science (80-.).* 336, 1030-1033.

Kuhn, P., Wilson, K., Patch, M. G. & Stevens, R. C. (2002). *Curr. Opin. Chem. Biol.* 6, 704-710.

de la Cruz, M. J., Hattne, J., Shi, D., Seidler, P., Rodriguez, J., Reyes, F. E., Sawaya, M. R., Cascio, D., Weiss, S. C., Kim, S. K., Hinck, C. S., Hinck, A. P., Calero, G., Eisenberg, D. & Gonen, T. (2017). *Nat. Methods.* 14, 399-402.

Lebioda, L. & Zhang, E. (1992). *J. Appl. Crystallogr.* 25, 323-324.

Liebschner, D., Afonine, P. V., Moriarty, N. W., Poon, B. K., Sobolev, O. V., Terwilliger, T. C. & Adams, P. D. (2017). *Acta Crystallogr. Sect. D Struct. Biol.* 73, 148-157.

López-Jaramillo, F. J., Moraleda, A. B., González-Ramírez, L. A., Carazo, A. & García-Ruiz, J. M. (2002). *Acta Crystallogr. Sect. D Biol. Crystallogr.* 58, 209-214.

Martynowycz, M., Glynn, C., Miao, J., de la Cruz, M. J., Hattne, J., Shi, D., Cascio, D., Rodriguez, J. & Gonen, T. (2017). *BioRxiv.*

Martynowycz, M. W., Hattne, J. & Gonen, T. (2020). *Structure.* 28, 458-464.e2.

Martynowycz, M. W., Zhao, W., Hattne, J., Jensen, G. J. & Gonen, T. (2019a). *Structure.* 27, 545-548.e2.

Martynowycz, M. W., Zhao, W., Hattne, J., Jensen, G. J. & Gonen, T. (2019b). *Structure.* 27, 1594-1600.e2.

McCoy, A. J., Grosse-Kunstleve, R. W., Adams, P. D., Winn, M. D., Storoni, L. C. & Read, R. J. (2007). *J. Appl. Crystallogr.* 40, 658-674.

McNae, I. W., Kan, D., Kontopidis, G., Patterson, A., Taylor, P., Worrall, L. & Walkinshaw, M. D. (2005). *Crystallogr. Rev.* 11, 61-71.

Moriarty, N. W., Grosse-Kunstleve, R. W. & Adams, P. D. (2009). *Acta Crystallogr. Sect. D Biol. Crystallogr.* 65, 1074-1080.

Nannenga, B. L., Shi, D., Hattne, J., Reyes, F. E. & Gonen, T. (2014). *Elife.* 3, e03600.

Nannenga, B. L., Shi, D., Leslie, A. G. W. & Gonen, T. (2014). *Nat. Methods.* 11, 927-930.

Parkhurst, J. M., Winter, G., Waterman, D. G., Fuentes-Montero, L., Gildea, R. J., Murshudov, G. N. & Evans, G. (2016). *J. Appl. Crystallogr.* 49, 1912-1921.

Pearce, N. M., Krojer, T. & von Delft, F. (2017). *Acta Crystallogr. Sect. D Struct. Biol.* 73, 256-266.

Pozharski, E., Weichenberger, C. X. & Rupp, B. (2013). *Acta Crystallogr. Sect. D Biol. Crystallogr.* 69, 150-167.

Purdy, M. D., Shi, D., Chrustowicz, J., Hattne, J., Gonen, T. & Yeager, M. (2018). *Proc. Natl. Acad. Sci.* 115, 13258-13263.

Reynolds, C. H. (2014). *ACS Med. Chem. Lett.* 5, 727-729.

Rodriguez, J. A., Ivanova, M. I., Sawaya, M. R., Cascio, D., Reyes, F. E., Shi, D., Sangwan, S., Guenther, E. L., Johnson, L. M., Zhang, M., Jiang, L., Arbing, M. A., Nannenga, B. L., Hattne, J., Whitelegge, J., Brewster, A. S., Messerschmidt, M., Boutet, S., Sauter, N. K., Gonen, T. & Eisenberg, D. S. (2015). *Nature.* 525, 486-490.

Sawaya, M. R., Rodriguez, J., Cascio, D., Collazo, M. J., Shi, D., Reyes, F. E., Hattne, J., Gonen, T. & Eisenberg, D. S. (2016). *Proc. Natl. Acad. Sci.* 113, 11232-11236.

Schindelin, J., Arganda-Carreras, I., Frise, E., Kaynig, V., Longair, M., Pietzsch, T., Preibisch, S., Rueden, C., Saalfeld, S., Schmid, B., Tinevez, J.-Y., White, D. J., Hartenstein, V., Eliceiri, K., Tomancak, P. & Cardona, A. (2012). *Nat. Methods.* 9, 676-682.

Schrödinger LLC (2014).

Seidler, P. M., Boyer, D. R., Rodriguez, J. A., Sawaya, M. R., Cascio, D., Murray, K., Gonen, T. & Eisenberg, D. S. (2018). *Nat. Chem.* 10, 170-176.

Shi, D., Nannenga, B. L., Iadanza, M. G. & Gonen, T. (2013). *Elife.* 2013, e01345.

Tickle, I., Sharff, A., Vinkovi?, M., Yon, J. & Jhoti, H. (2004). *Chem. Soc. Rev.* 33, 558.

Unwin, N. (1995). *Nature.* 373, 37-43.

Waterman, D. G., Winter, G., Gildea, R. J., Parkhurst, J. M., Brewster, A. S., Sauter, N. K. & Evans, G. (2016). *Acta Crystallogr. Sect. D, Struct. Biol.* 72, 558-575.

Winter, G., Waterman, D. G., Parkhurst, J. M., Brewster, A. S., Gildea, R. J., Gerstel, M., Fuentes-Montero, L., Vollmar, M., Michels-Clark, T., Young, I. D., Sauter, N. K. & Evans, G. (2018). *Acta Crystallogr. Sect. D Struct. Biol.* 74, 85-97.

INCORPORATION BY REFERENCE

Each publication and patent mentioned herein is hereby incorporated by reference in its entirety. In case of conflict, the present specification, including any definitions herein, will control.

EQUIVALENTS

While specific embodiments of the subject invention have been discussed, the above specification is illustrative and not restrictive. Many variations of the invention will become apparent to those skilled in the art upon review of the preceding description and the following claims. The full scope of the invention should be determined by reference to the claims, along with their full scope of equivalents, and by reference to the rest of the specification, along with such variations.

What is claimed is:

1. A method of introducing a small molecule into a crystal of a macromolecule, comprising
    applying a first sample comprising the crystal of the macromolecule onto an electron microscopy (EM) grid; and
    contacting the crystal with a second sample comprising the small molecule to introduce the small molecule into the crystal.

2. The method of claim 1, wherein the EM grid has a carbon side and a copper side, and wherein both said applying the first sample and said contacting with the second sample are on the carbon side.

3. The method of claim 2, further comprising blotting the EM grid from the copper side after applying said first sample but before contacting with said second sample.

4. The method of claim 2, further comprising blotting the EM grid from the copper side after contacting with said second sample.

5. The method of claim 1, further comprising plunging the EM grid into a cryogenic liquid.

6. The method of claim 5, wherein the cryogenic liquid is liquid ethane.

7. The method of claim 1, comprising simultaneously introducing a plurality of said small molecules into a plurality of crystals of said macromolecule such that different crystals are contacted with the same small molecule simultaneously or such that different crystals are contacted with a different small molecule.

8. The method of claim 1, comprising introducing a plurality of said small molecule into a plurality of crystals of said macromolecule at a stoichiometric ratio between said small molecule and said macromolecule.

9. The method of claim 1, wherein the macromolecule is a protein.

10. A method of obtaining a microcrystal comprising a macromolecule and a small molecule from a crystal of the macromolecule, comprising
    applying a first sample comprising the crystal of the macromolecule onto an electron microscopy (EM) grid;
    contacting the crystal with a second sample comprising the small molecule to obtain a crystal comprising the macromolecule and the small molecule;
    plunging the EM grid into a cryogenic liquid;
    placing the EM grid into a focused ion beam scanning electron microscope (FIB/SEM); and
    milling the crystal comprising the macromolecule and the small molecule in the FIB/SEM using a focused ion beam to obtain a microcrystal comprising the macromolecule and the small molecule.

11. The method of claim 10, wherein the EM grid has a carbon side and a copper side, and wherein both said applying the first sample and said contacting with the second sample are on the carbon side.

12. The method of claim 11, further comprising blotting the EM grid from the copper side after applying said first sample but before contacting with said second sample.

13. The method of claim 11, further comprising blotting the EM grid from the copper side after a contacting with said second sample.

14. The method of claim 10, wherein the cryogenic liquid is liquid ethane.

15. The method of claim 10, wherein the microcrystal obtained using said milling has at least one dimension that is at most 100, 150, 200, 250, 300, 350, or 400 nanometers.

16. The method of claim 10, wherein the macromolecule is a protein.

17. The method of claim 10, wherein said milling is under cryogenic conditions.

18. The method of claim 10, further comprising depositing platinum on the crystal comprising the macromolecule and the small molecule by sputter coating the grid before said milling.

19. A method of determining a structural model for a complex comprising a macromolecule and a small molecule, comprising
    applying a first sample comprising a crystal of the macromolecule onto an electron microscopy (EM) grid;
    contacting the crystal with a second sample comprising the small molecule to obtain a crystal comprising the macromolecule and the small molecule;
    plunging the EM grid into a cryogenic liquid;
    placing the EM grid into a focused ion beam scanning electron microscope (FIB/SEM);
    milling the crystal comprising the macromolecule and the small molecule in the FIB/SEM using a focused ion beam to obtain a microcrystal comprising the macromolecule and the small molecule;
    placing the microcrystal comprising the macromolecule and the small molecule into a transmission electron microscope (TEM);
    collecting a plurality of electron diffraction patterns from the microcrystal; and
    determining a structural model based on the plurality of electron diffraction patterns.

20. The method of claim 19, wherein the macromolecule is a protein.

\* \* \* \* \*